US012464015B2

United States Patent
Matefi

(10) Patent No.: US 12,464,015 B2
(45) Date of Patent: Nov. 4, 2025

(54) DEVICE, METHOD, AND SYSTEM FOR SUPPORTING BOTNET TRAFFIC DETECTION

(71) Applicant: Telefonaktiebolaget LM Ericsson (publ), Stockholm (SE)

(72) Inventor: Gergely Matefi, Budapest (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 203 days.

(21) Appl. No.: 18/268,774

(22) PCT Filed: Dec. 22, 2020

(86) PCT No.: PCT/SE2020/051257
§ 371 (c)(1),
(2) Date: Jun. 21, 2023

(87) PCT Pub. No.: WO2022/139642
PCT Pub. Date: Jun. 30, 2022

(65) Prior Publication Data
US 2024/0080337 A1    Mar. 7, 2024

(51) Int. Cl.
*H04L 9/40*    (2022.01)
*G06F 21/55*    (2013.01)
(Continued)

(52) U.S. Cl.
CPC ........ *H04L 63/1458* (2013.01); *G06F 21/554* (2013.01); *G06N 20/00* (2019.01);
(Continued)

(58) Field of Classification Search
CPC ..... G06N 20/00; H04L 41/16; H04L 63/1416; H04L 63/1426; H04L 63/1458; H04L 2463/144
See application file for complete search history.

(56) References Cited

U.S. PATENT DOCUMENTS 10,594,711 B2 *   3/2020   Levin ................. H04L 63/1425
11,334,764 B2 *   5/2022   Zeng ................. G06F 18/24323
(Continued)

FOREIGN PATENT DOCUMENTS

EP    3 694 177 A1    8/2020
WO   2018/224669 A1   12/2018

OTHER PUBLICATIONS

International Search Report and Written Opinion issued in International Application No. PCT/SE2020/051257 dated Sep. 13, 2021 (12 pages).

(Continued)

*Primary Examiner* — Thomas J Dailey
(74) *Attorney, Agent, or Firm* — Rothwell, Figg, Ernst & Manbeck, P.C.

(57) ABSTRACT

The invention relates to a method, a device (101), a system (106), a computer program (504) and a computer program product (505) for supporting botnet traffic detection. A device (101) for supporting botnet traffic detection obtains information associated with a first data flow of a first communication device (104*a*) and information associated with a second data flow of the first communication device (104*a*) or of a second communication device (104*b*), and trains a first and a second prediction model. The first and second prediction models are applied to data traffic and a label based on the outputs of the first and the second prediction models is associated with the traffic, wherein the label either indicates benign traffic or malicious traffic.

20 Claims, 5 Drawing Sheets

(51) Int. Cl.
    *G06N 20/00*     (2019.01)
    *H04L 41/16*     (2022.01)

(52) U.S. Cl.
    CPC .......... *H04L 41/16* (2013.01); *H04L 63/1416* (2013.01); *H04L 63/1425* (2013.01); *H04L 2463/144* (2013.01)

(56) References Cited

U.S. PATENT DOCUMENTS

| | | | |
|---|---|---|---|
| 12,015,622 B2* | 6/2024 | Zhou | H04L 63/0428 |
| 2018/0150635 A1* | 5/2018 | Melvin | G06N 20/00 |
| 2018/0351972 A1* | 12/2018 | Yu | H04L 63/1416 |
| 2020/0012891 A1 | 1/2020 | Watson et al. | |
| 2023/0328081 A1* | 10/2023 | Najafirad | H04L 63/1416 |

OTHER PUBLICATIONS

Gu, g., et. al., "BotMiner: Clustering Analysis of Network Traffic for Protocol- and Structure-Independent Botnet Detection," Proceedings of the 17th USENIX Security Symposium, Jul. 28-Aug. 1, 2008, San Jose, CA, USA (16 pages).

Alejandre, F.V., et. al., "Botnet Detection using Clustering Algorithms," Research in Computing Science 118 (2016) (pp. 65-75).

Nomm, S., et. al., "Unsupervised Anomaly Based Botnet Detection in IoT Networks," 2018 17th IEEE International Conference on Machine Learning and Applications, 2018 (6 pages).

Zeidanloo, H., et. al., "Botnet Detection Based on Traffic Monitoring," 2010 International Conference on Networking and Information Technology, 2010 (5 pages).

Chen, W., et. al., "Exploring a Service-Based Normal Behaviour Profiling System for Botnet Detection," IFIP/IEEE IM, 2017 (6 pages).

Tegeler, F., et. al., "BotFinder: Finding Bots in Network Traffic Without Deep Packet Inspection," Co-NEXT'12, Dec. 10-13, 2012, Nice, France (12 pages).

\* cited by examiner

DEVICE, METHOD, AND SYSTEM FOR SUPPORTING BOTNET TRAFFIC DETECTION

CROSS REFERENCE TO RELATED APPLICATIONS

This application is a 35 U.S.C. § 371 National Stage of International Patent Application No. PCT/SE2020/051257, filed 2020 Dec. 22.

TECHNICAL FIELD

The invention relates to a device, a method, and a system for supporting botnet traffic detection, and corresponding computer program and computer program product.

BACKGROUND

A botnet is a network of compromised devices, called bots, infected with malicious code. Bots can be controlled remotely by an attacker, often called botmaster. The botmaster can abuse the resources of the infected devices and generate attacks, such as distributed denial-of-service (DDoS) attacks, spam, cryptomining, and information exfiltration from the infected devices.

A botnet is controlled through a Command-and-Control (C&C) channel, on which bot activities are coordinated, i.e., bots receive commands and report bot activities on the C&C channel.

Solutions for detecting botnet-related data traffic proposed in the art use either signature-based or unsupervised detection techniques.

Signature-based techniques leverage that C&C channels of a botnet send similar traffic to the C&C server, and their signatures can be detected. Detection models used in signature-based techniques are defined either by security experts or are built using supervised machine learning techniques from representative malware samples. Tegler Et Al: Botfinder: Finding bots in network traffic without deep packet inspection. In: Proceedings of the 8th international conference on Emerging networking experiments and technologies, 2012, p. 349-360 discloses a BotFinder system for infected host detection in a network using high-level properties of the bot's network traffic and compares training traffic to known signatures or special communication patterns.

Unsupervised detection techniques do not require malware samples or a priori knowledge of signatures but extract suspicious signs from traffic observations to perform anomaly detection. Anomaly-based detection methods learn regular traffic patterns of communicating entities and raise alerts whenever high deviation from the regular behavior is observed. Chen Et Al: Exploring a service-based normal behaviour profiling system for botnet traffic detection, 2017 IFIP/IEEE Symposium on Integrated Network and Service Management (IM). IEEE, 2017, p. 947-952 discloses a profiling-based botnet traffic detection system using three unsupervised learning algorithms on service-based flow-based data, including self-organizing map, local outlier, and k-NN outlier factors. Zeidanloo Et Al: Botnet detection based on traffic monitoring, 2010 IEEE International Conference on Networking and Information Technology. IEEE, 2010, pp. 97-101 discloses a detection framework based on finding similar communication patterns and behaviors among a group of hosts that are performing at least one malicious activity.

Supervised methods are accurate on identifying known botnets for which they were built. However, they provide usually poor detection performance on zero-day threats and emerging new botnet types, which limit their usability in the continuously developing cyberthreat landscape. Instead, anomaly detection-based approaches work well whenever legitimate traffic follows regular patterns. However, whenever legitimate traffic shows high variability, detection-based approaches provide insufficient accuracy on detecting C&C traffic. For example, traffic generated by motion sensors may show high variability.

Moreover, IoT devices of the same type usually generate Machine-to-Machine (M2M) traffic with similar characteristics. Whenever large device fleets with the same or with a few different device types are inspected, many cross-device traffic similarities can be detected. Consequently, botnet detectors working purely on similarity mining will generate many false positive hits, resulting in low accuracy.

Furthermore, botnet traffic detection methods combining traffic similarity analysis with attack detection fail when the botnet remains stealthy and does not generate an easily detectable attack like a DoS attack. This could be the case e.g. for Cryptomining.

SUMMARY

An object of the invention is to improve accuracy for botnet traffic detection in comparison to the above solutions.

To achieve said object, in a first aspect, a device for supporting botnet traffic detection is provided. Said device comprises a processor and a memory, the memory containing instructions executable by the processor. The instructions, when executed by the processor, cause the device to obtain information associated with a first data flow of a first communication device and information associated with a second data flow of the first communication device or a second communication device; associate the first data flow with a first network flow aggregate, and the second data flow with a second network flow aggregate; create a first feature set for the first network flow aggregate as a first training set, and a second feature set for the second network flow aggregate as a second training set; train a first prediction model using the first training set, and a second prediction model using the second training set; apply the first prediction model and the second prediction model to the second feature set of the second network flow aggregate; select an output of the first prediction model as a first anomaly score for the second network flow aggregate, and an output of the second prediction model as a second anomaly score for the second network flow aggregate; associate the second network flow aggregate with a connection, wherein the connection is based on source and destination information, protocol and destination port of the second data flow of the second network flow aggregate; determine an average difference value for the connection, wherein the average difference value is an average of a difference between the first anomaly score and the second anomaly score; and associate the connection with a label based on the average difference value and a first threshold, wherein the label either indicates benign traffic or malicious traffic.

The combination of behavior profiling for checking that botnet traffic is different from benign traffic, and of a similarity mining technique for checking that botnet traffic became a (relatively) frequent traffic, provides a better botnet traffic detection accuracy.

In a second aspect, there is provided a method for supporting botnet traffic detection performed by a device for supporting botnet traffic detection. The method of this second aspect comprises obtaining information associated with a first data flow of a first communication device and information associated with a second data flow of the first communication device or a second communication device; associating the first data flow with a first network flow aggregate, and the second data flow with a second network flow aggregate; creating a first feature set for the first network flow aggregate as a first training set, and a second feature set for the second network flow aggregate as a second training set; training a first prediction model using the first training set, and a second prediction model using the second training set; applying the first prediction model and the second prediction model to the second feature set of the second network flow aggregate; selecting an output of the first prediction model as a first anomaly score for the second network flow aggregate, and an output of the second prediction model as a second anomaly score for the second network flow aggregate; associating the second network flow aggregate with a connection, wherein the connection is based on source and destination information, protocol and destination port of the second data flow of the second network flow aggregate; determining an average difference value for the connection, wherein the average difference value is an average of a difference between the first anomaly score and the second anomaly score; and associating the connection with a label based on the average difference value and a first threshold, wherein the label either indicates benign traffic or malicious traffic.

In a third aspect, there is provided a system comprising a device for supporting botnet traffic detection, a Security Information and Event Management system, and a flow exporter device. The communication system of this third aspect comprises the flow exporter device configured to send information associated with a first data flow of a first communication device and information associated with a second data flow of the first communication device or a second communication device to the device for supporting botnet traffic detection. The communication system of this third aspect also comprises the device for supporting botnet traffic detection configured to receive the information from the flow exporter device; associating the first data flow with a first network flow aggregate, and the second data flow with a second network flow aggregate; create a first feature set for the first network flow aggregate as first training set, and a second feature set for the second network flow aggregate as second training set; train a first prediction model using the first training set, and a second prediction model using the second training set; apply the first prediction model and the second prediction model to the second feature set of the second network flow aggregate; select an output of the first prediction model as a first anomaly score for the second network flow aggregate, and an output of the second prediction model as a second anomaly score for the second network flow aggregate; associate the second network flow aggregate with a connection, wherein the connection is based on source and destination information, protocol and destination port of the second data flow of the second network flow aggregate; determine an average difference value for the connection, wherein the average difference value is an average of a difference between the first anomaly score and the second anomaly score; associate the connection with a label based on the average difference value and a first threshold, wherein the label either indicates benign traffic or malicious traffic; and send an alert to the Security Information and Event Management system if the associated label indicates malicious traffic. The communication system of this third aspect also comprises the Security Information and Event Management system configured to receive the alert and perform a mitigation action.

In an embodiment of the first, second, and third aspect, the first data flow relates to benign traffic and the second data flow relates to evaluation traffic, and the information associated with the first data flow and the second data flow comprises destination and source information, and traffic statistics, wherein traffic statistics comprise data flow starting time, data flow ending time, data flow duration, and data flow traffic volume from source to destination and from destination to source.

In an embodiment of the first and second aspect, the device is configured to discard the information associated with the first data flow and/or the information associated with the second data flow if the information matches a criterion of a filter based on a destination and source information. Thus, reducing computational demands of subsequent steps, and reducing false positives.

In an embodiment of the first, second, and third aspect, the device is configured to associate the first data flow with a first aggregation window, based on the data flow starting time, source and destination information, protocol and destination port of the first data flow; and to associate the second data flow with a second aggregation window, based on the data flow starting time, source and destination information, protocol and destination port of the second data flow.

In an embodiment of the first, second, and third aspect, the device is configured to associate the first data flow of the first aggregation window with a slot of the first aggregation window, based on the data flow starting time, source and destination information, protocol and destination port of the first data flow; and to associate the second data flow of the second aggregation window with a slot of the second aggregation window, based on the data flow starting time, source and destination information, protocol and destination port of the second data flow.

In an embodiment of the first and second aspect, the device is configured to determine a first inter-flow set for the first network flow aggregate, wherein the first inter-flow set comprises a first inter-flow time; and to determine a second inter-flow set for the second network flow aggregate, wherein the second inter-flow set comprises a second inter-flow time.

In an embodiment of the first and second aspect, the device is configured to associate a plurality of first inter-flow times with the first inter-flow set, wherein the first inter-flow times are ordered in an ascending order; and to associate a plurality of second inter-flow times with the second inter-flow set, wherein the second inter-flow times are ordered in an ascending order.

In an embodiment of the first and second aspect, the first inter-flow time is a time difference between the data flow starting time of the first data flow and a consecutive data flow starting time of a further first data flow associated with the first network flow aggregate; and the second inter-flow time is a time difference between the data flow starting time of the second data flow and a consecutive network flow starting time of a further second data flow associated with the second network flow aggregate.

In an embodiment of the first and second aspect, the device is configured to associate a plurality of first data flows with the first network flow aggregate, and to associate a plurality of the second data flows with the second network flow aggregate.

In an embodiment of the first and second aspect, the device is configured to discard the first network flow aggregate if all the first data flows associated with the first network flow aggregate are related to unidirectional traffic and/or if the first data flows associated with the first network flow aggregate are fewer than a second threshold; and/or to discard the second network flow aggregate if all the data flows associated with the second network flow aggregate are related to unidirectional traffic and/or if the second data flows associated with the second network flow aggregate are fewer than the second threshold. Thus, excluding data flow aggregates from subsequent analysis which are unlikely to be related to botnet traffic.

In an embodiment of the first, second, and third aspect, the first feature set is based on a feature extracted from the first network flow aggregate, wherein the feature is a value based on traffic volume and packet number distributions and/or temporal behavior of the first network flow aggregate; and the second feature set is based on a feature extracted from the second network flow aggregate, wherein the feature is a value based on traffic volume and packet number distributions and/or temporal behavior of the second network flow aggregate.

In an embodiment of the first and second aspect, the device is configured to normalize the average difference value.

In an embodiment of the first and second aspect, the device is configured to perform an action based on the associated label.

In an embodiment of the first and second aspect, the device is configured to perform an action based on the associated label, wherein the action is an alert sent to a Security Information and Event Management system if the associated label indicates malicious traffic.

In an embodiment of the first and second aspect, the device is configured to train a first prediction model and a second prediction model, wherein the first prediction model and the second prediction model are machine learning model models based on an unsupervised method. In yet a further aspect, there is provided a computer program comprising instructions, which, when run in a processing unit cause the device to obtain 201 information associated with a first data flow of a first communication device and information associated with a second data flow of the first communication device or a second communication device; associate the first data flow with a first network flow aggregate, and the second data flow with a second network flow aggregate; create a first feature set for the first network flow aggregate as first training set, and a second feature set for the second network flow aggregate as second training set; train a first prediction model using the first training set, and a second prediction model using the second training set; apply the first prediction model and the second prediction model to the second feature set of the second network flow aggregate; select an output of the first prediction model as a first anomaly score for the second network flow aggregate, and an output of the second prediction model as a second anomaly score for the second network flow aggregate; associate the second network flow aggregate with a connection, wherein the connection is based on source and destination information, protocol and destination port of the second data flow of the second network flow aggregate; determine an average difference value for the connection, wherein the average difference value is an average of a difference between the first anomaly score and the second anomaly score; and associate the connection with a label based on the average difference value and a first threshold, wherein the label either indicates benign traffic or malicious traffic.

In yet a further aspect, there is provided a computer program product comprising a computer readable storage medium on which a computer program, as mentioned above, is stored.

BRIEF DESCRIPTION OF THE DRAWINGS

For an even better understanding of the present disclosure, and to show more readily how the invention may be carried into effect, reference will now be made, by way of example, to the following drawings, in which.

DETAILED DESCRIPTION

Embodiments will be illustrated herein with reference to the accompanying drawings. These embodiments are provided by way of example so that this disclosure will be thorough and complete, and will fully convey the scope of the inventive concept to those skilled in the art.

It is to be noted that terms botnet traffic and Command-and-Control (C&C) traffic are used in an interchangeable way.

An insight the inventor has made is that C&C traffic is different from legitimate traffic but typically becomes a (relatively) frequent traffic component due to repetitive C&C transmission and to increasing number of bots sending C&C traffic. This insight is here utilized for the invention. According to an aspect of the invention, botnet traffic detection is achieved by training a first machine learning (ML) model with a first dataset of legitimate traffic, and training a second ML model with a second dataset that represents the observed traffic that could be contaminated with C&C traffic. If traffic contaminated with C&C traffic is given as an input to both ML models, the first ML model will generate a high anomaly score as an output, because botnet C&C traffic is dissimilar from the first dataset; while the second model will assign a low anomaly score as an output, because the second model learns that traffic contaminated with C&C traffic is regular traffic. A label indicating/representing either 'benign' or 'malicious' traffic is associated with the input traffic, wherein the associated label is based on a difference between the two anomaly scores and a threshold. An anomaly score difference exceeding the threshold means that the traffic will be labelled as 'malicious'. 'Benign' traffic is traffic (sometimes referred to as legitimate traffic) not contaminated with C&C traffic/data, 'malicious' traffic is traffic contaminated with C&C traffic/data.

The combination of behavior profiling for checking that C&C traffic is different from benign traffic, and of a similarity mining technique for checking that C&C traffic became a (relatively) frequent traffic, provides a better botnet traffic detection accuracy.

Figure 1:
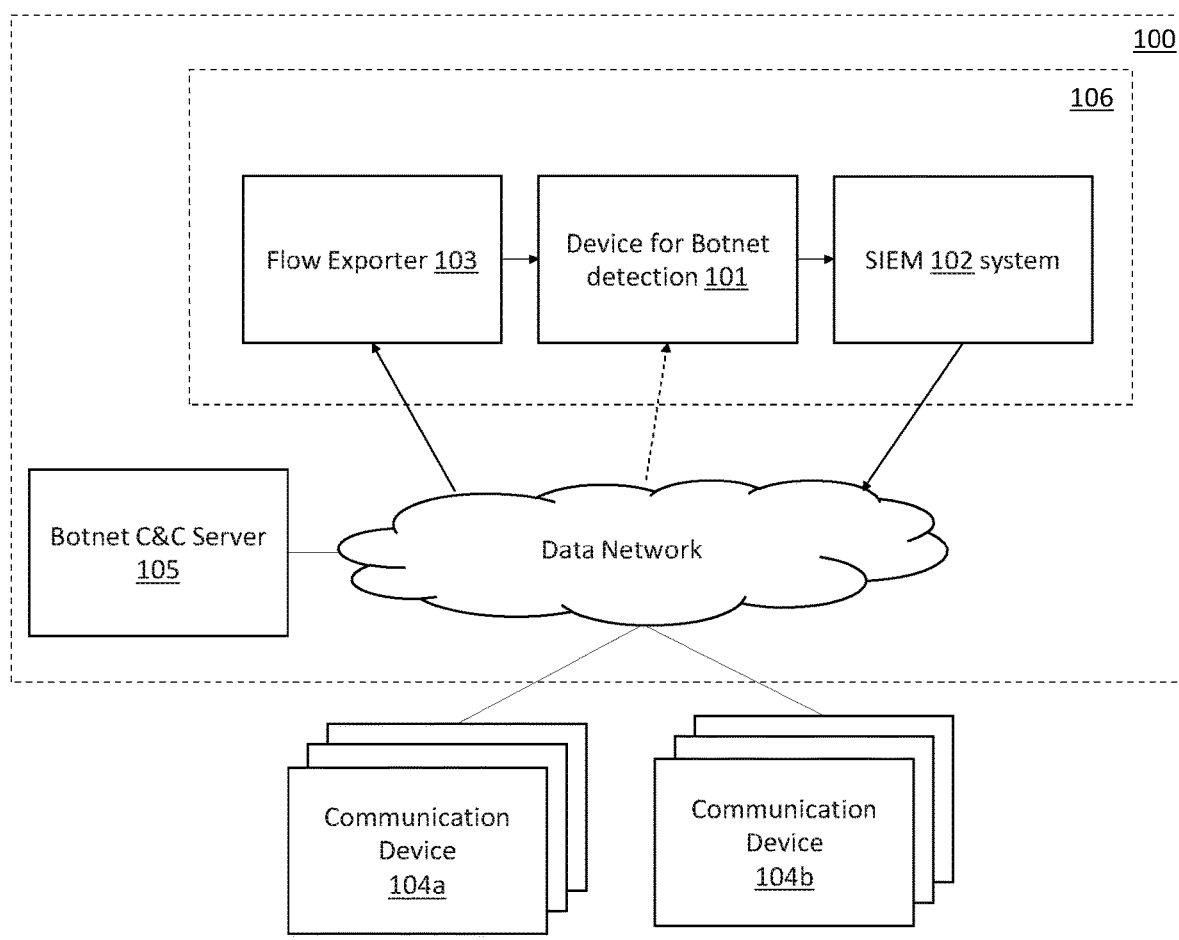
FIG. 1 is a schematic overview depicting an exemplary system using devices according to embodiments.

FIG. 1 schematically shows an example of a telecommunications system 100 in which the present invention may be practiced. The illustrated telecommunication system 100 comprises a device 101 for botnet traffic detection, a Security Information and Event Management, (SIEM) system 102, a flow exporter 103, and a botnet Command-and-Control, C&C, server 105 connected to a data network. In FIG. 1, the flow exporter 103, the device 101 for botnet traffic detection, and the SIEM 102 form a system 106 for supporting botnet traffic detection. A plurality (i.e. two or more) of communication devices 104a, 104b are also connected to a data network.

The flow exporter 103 records information about data flows traversing a communication device 104a, 104b such as a router, switch, firewall, and host, creates data flow records by aggregating packet information from communication devices 104a, 104b, and exports the data flow records to the device 101. A data flow is a sequence of packets from a source to a destination and a data flow record contains information associated with a data flow that belongs to a same communication channel between two devices on a particular protocol. Information associated with a data flow source Internet Protocol (IP) address, destination IP address, source port, destination port and protocol, timestamps for the data flow start and finish time, number of bytes and packets observed in the flow, Type of Service (ToS) value, Layer 3 Routing information, e.g., IP address of the immediate next-hop along the route to the destination and source and destination IP masks. Data flow records is exported using for example User Datagram Protocol (UDP) or Stream Control Transmission Protocol (SCTP), and collected using for example a NetFlow collector, IP Flow Information Export (IPFIX) sFlow, Jflow, Netstream, cflowd. A data flow dataset is a time-ordered sequence of data flow records collected within a given time period.

The device 101 for botnet detection and flow exporter 103 are in one embodiment a router, gateway, or any device with computing, storage, and network connectivity to the communication network 100 when active. The SIEM 102 system is in one embodiment one or more servers, routers, gateways, or any device with computing, storage, and network connectivity to the communication network 100 when active. The SIEM 102 system provides real-time analysis of security alerts generated by applications and network hardware. The SIEM 102 system, according to an embodiment, receives an alert from the device 101. The device 101 for botnet detection, SIEM 102, and flow exporter 103 can be hosted on the same physical devices or can be stand-alone physical devices. Furthermore, functionality performed by the device 101 for botnet detection, SIEM 102, and flow exporter 103 may be performed in a plurality of physically separated nodes arranged in a cloud environment or by a centralized entity.

Communication devices 104a, 104b in FIG. 1 is in one embodiment be comprised in a Machine Type Communication (MTC) device, a Machine-to-Machine (M2M), an Internet of Things (IoT) device, router, gateway, and any device with computing, storage, and network connectivity to the communication network 100 when active. A communication device 104a, 104b may here have been infected with rootkits or other types of malware, such as ransomware.

A botnet is a network of compromised devices, called bots, infected with malicious code and remotely controlled by one or more attackers. The botnet C&C server 105 is any device with computing, storage, and network connectivity to the communication network 100 when active, and is controlled by one or more attackers. The botnet C&C server 105 issues updates, commands, or other information through a Command-and-Control (C&C) channel to the bots. The bots report bot activities on the C&C channel.

The communication network 100 may be according to one or more communications technologies such as for example Second Generation (2G), Third Generation (3G), Fourth Generation (4G), Fifth Generation (5G), and any other Third Generation Partnership Project (3GPP), radio access technology, or other communication network technologies including any mixed network systems, such as a wireless system including 3GPP 4G network devices, 3GPP 5G network devices, and IEEE 802.11 access points. It may of course also be applicable as a future implementation in a future system like a foreseen 3GPP 6G network.

In the embodiment illustrated in FIG. 1, the device 101 for botnet detection, SIEM 102, and flow exporter 103 can communicate with each other, as well with one or more communication devices 104a, 104b through a subscription protocol, such as message queuing telemetry transport (MQTT) protocol, or utilizing any one of a number of transfer protocols (e.g., frame relay, IP, transmission control protocol (TCP), UDP, hypertext transfer protocol (HTTP), HTTP/2) and Remote Procedure Call (RPC), protocols, such as gRPC, and ensuring security requirements by using transport layer security, TLS. In case of HTTP protocol, the device 101 can receive a data flow record from the flow exporter 103 in a HTTP "POST" message and send an alert in a HTTP "POST" message to the SIEM 102.

Figure 2:
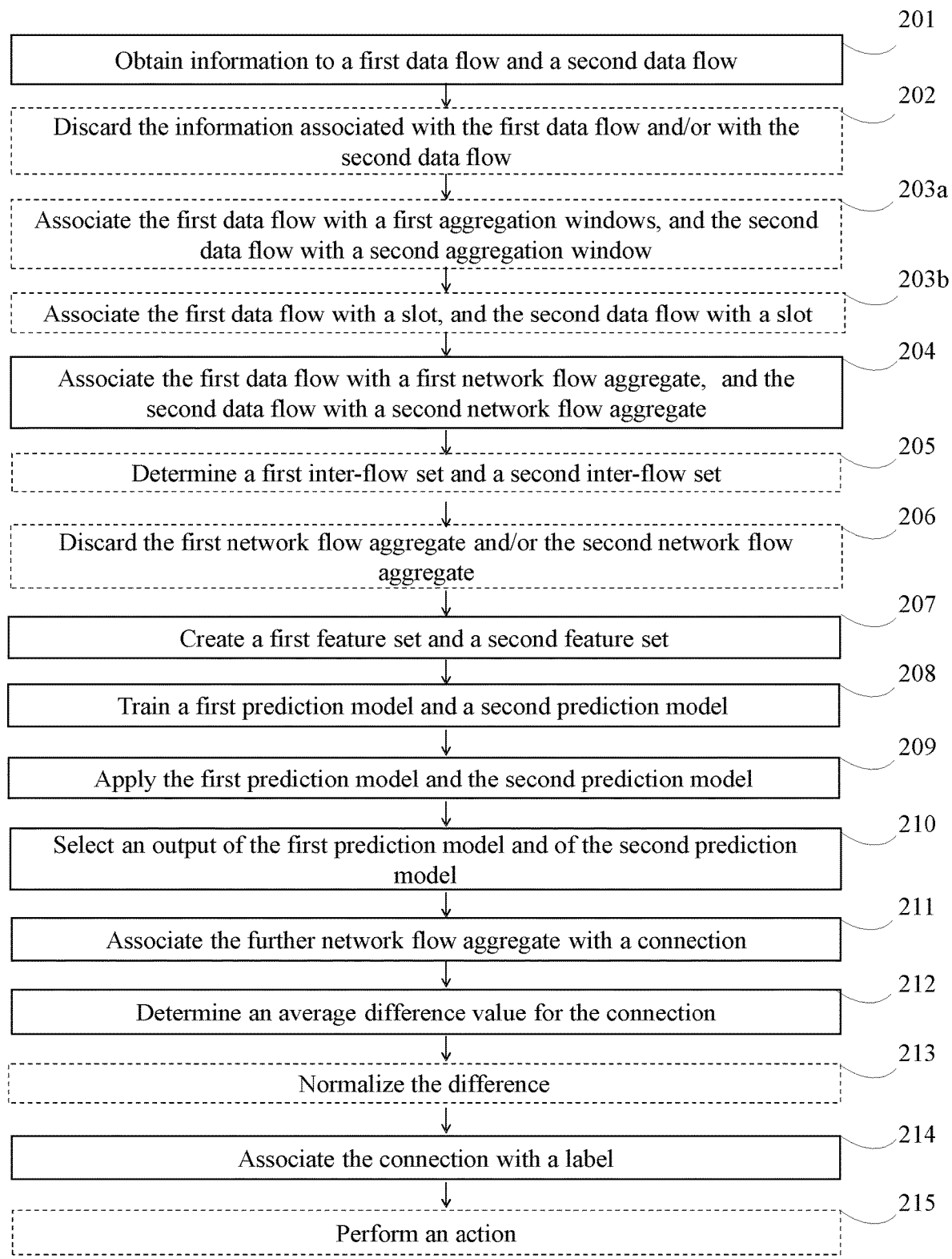
FIG. 2 shows a method performed by a device according to an embodiment.

FIG. 2 shows a method for supporting botnet traffic detection. The method can be carried out by the device 101 for supporting botnet traffic detection. The steps of the method as indicated in FIG. 2 is in one embodiment taken in the order stated below.

Referring to the method in FIG. 2, the device 101 obtains information associated with one or more communication devices 104a, 104b in step 201. According to an embodiment, the information is optionally obtained from the flow exporter 103. The obtained information relates to two data flow datasets. The first dataset relates to benign traffic, wherein the benign traffic is traffic (sometimes referred to as legitimate traffic) not contaminated with C&C traffic/data. The first dataset is a collection of data flow records associated with one or more first data flows. The wording "baseline dataset" and "first dataset" will be used interchangeably. The second dataset relates to traffic that could be contaminated with C&C traffic/data. The second dataset is a collection of data flow records associated with the one or more first data flows or one or more second data flows. In other words, the data flow information used in the first and in the second dataset can be collected from a single communication device 104a (information associated with the first data flow relates to a first communication device 104a and information associated with the second data flow relates to the first communication device) or multiple communication devices 104a, 104b (information associated with the first data flow relates to a first communication device 104a and information associated with the second data flow relates to a second communication device 104b). The wording "evaluation dataset" and "second dataset" will be used interchangeably. The first and the second datasets are collected for a time period, here called dataset window. The first dataset is collected for or during a first dataset window and the second dataset is collected for or during a second dataset window. By default, a dataset window is in an embodiment 24 hours. For a lower number of communication devices 104a, 194b, or for traffic with longer seasonality periods, longer dataset windows may be used.

According to an embodiment, the information associated with the first data flows and the second data flows comprises destination and source information, and traffic statistics. Destination and source information comprises or is for example a port and, at least one of an IP address, a unique human-readable name, and a unique alphanumeric name. In some embodiments, destination and source information do not comprise the port. The traffic statistics comprise data flow starting time, data flow ending time, data flow duration, and data flow traffic volume from source to destination and from destination to source. The data flow starting time of a data flow is a point in time a first packet of the data flow crosses the flow exporter or a corresponding probe, the data flow ending time of a data flow is a point in time a last packet of the data flow crosses the flow exporter or a corresponding probe, data flow duration of a data flow is a difference between data flow end time and data flow starting time of the data flow, and data flow traffic volume of a data flow from source to destination and from destination to source is the amount of data packets sent from source to destination and vice versa, respectively.

In an optional step 202, the device 101 discards data flow records associated with the first data flows and/or discards the data flow records associated with the second data flows if the information matches a criterion of a filter based on a destination and source information. Examples of filters are whitelists of reliable hosts comprising an address list of regular Internet of Things (IoT), backend servers, and/or an address list of infrastructural components like Domain Name System (DNS) servers or messaging facilities. Step 202 allows a reduction of computational demands of subsequent steps of the method in FIG. 2, and of false positives.

According to an optional embodiment and step 203a, the device associates a first data flow with a first aggregation window, based on the data flow starting time of the first data flow. Furthermore, the device associates the second data flow with a second aggregation window, based on the data flow starting time of the second data flow. According to an optional embodiment and step 203b, the device associates the first data flow of the first aggregation window with a slot of the first aggregation window, based on the data flow starting time, source and destination information, protocol and destination port of the first data flow; and associates the second data flow of the second aggregation window with a slot of the second aggregation window, based on the data flow starting time, source and destination information, protocol and destination port of the second data flow. In other words, there can be more than one aggregation window and each data flow record is mapped into one aggregation window and into one slot of the respective aggregation window, based on the data flow starting time of the data flow. A default aggregation window size is 1 hour, which fits well for usual C&C traffic with a period in the few minutes order. For detecting C&C traffic with lower frequency, such as 1 message/hour or packet/hour, larger aggregation window size may be used. Every aggregation window is split into slots, where the default slot size is, for example, 1 minute. More details about the aggregation window will be further provided in relation to FIG. 4b.

In step 204, the device 101 associates a first data flow with a first network flow aggregate, and the second data flow with a second network flow aggregate. A network flow aggregate is a set of data flows that share one or more characteristics, such as aggregation window, source and destination IP address, protocol and destination port. In other words, there can be one or more network flow aggregates and data flow records which share the same aggregation window, source and destination IP address, protocol and destination port, mapped into the same network flow aggregate, and one data flow is associated with one network flow aggregate.

In an optional step 205, the device 101 determines a first inter-flow set for the first network flow aggregate, wherein the first inter-flow set comprises one or more first inter-flow times. A first inter-flow time is a time difference between the data flow starting time of the first data flow and a consecutive data flow starting time of a further first data flow associated with the first network flow aggregate. Moreover, in step 205, the device 101 determines a second inter-flow set for the second network flow aggregate, wherein the second inter-flow set comprises one or more second inter-flow times. A second inter-flow time is a time difference between the data flow starting time of the second data flow and a consecutive data flow starting time of a further second data flow associated with the first network flow aggregate. In other words, an inter-flow set can be a vector comprising one or more inter-flow times calculated as time difference between two consecutive flow start times of data flows within the same network flow aggregate.

In an optional step 206, the device 101 discards a first network flow aggregate if all the data flows associated with the first network flow aggregate are related to unidirectional traffic, i.e. only sent or only received traffic. In other words, if either all the data flows associated with a network flow aggregate are related to send-only traffic or all the data flows associated with the network flow aggregate are related to receive-only traffic, the network flow aggregate is discarded. Moreover, the device 101 discards the first network flow aggregate if the data flows associated with the first network flow aggregate is lower in number than a second threshold. Moreover, in the optional step 206, the device 101 discards the second network flow aggregate if all data flows associated with the second network flow aggregate are related to unidirectional traffic and/or if the data flows associated with the second network flow aggregate is lower in number than the second threshold, wherein the second threshold can be a number up to 10, such as 4. This step excludes flow aggregates from subsequent analysis which are unlikely to be related to C&C communication.

In step 207, the device 101 creates a first feature set for a first network flow aggregate and a second feature set for a second network flow aggregate as a second training set. A feature set is a vector that comprises features extracted from the respective network flow aggregate. A feature characterizes traffic of a flow aggregate. The feature set describes for example traffic volume and packet number distributions of flows within a network flow aggregate and/or capture temporal behavior of flow initiations. Examples of features comprised in the feature set are first, second and third quartiles of volume and packet number distributions of data flow traffic from source to destination and vice versa, or a logarithm of volume and packet number distributions of data flow traffic from source to destination and vice versa. Alternatively, quartiles may be replaced with histograms. For temporal analysis, examples of features are burstiness and inter-burst times. Burstiness is characterized by computing the average number of data flows per slot within a network flow aggregate, wherein the slots considered are the slots which have one or more associated data flows. Inter-burst times are computed by taking a median of inter-flow times which exceed a predefined threshold. A typical threshold value is 5 seconds. The first feature set will be used as first training set and the second feature set will be used as second training set.

In step 208, the device 101 trains a first prediction model using as input the first training set, and a second prediction model using the second training set as input. According to an embodiment, the first prediction model and the second prediction model are a machine learning model based on an unsupervised method. The first prediction model and the second prediction model use the same unsupervised method. The unsupervised method is an anomaly detection model. An anomaly detection machine learning model assigns anomaly scores as an output. The assigned anomaly scores are minimized for inputs following regular patterns and maximized for inputs following irregular patterns. Examples of anomaly detection models are Isolation Forest, Autoencoder, k Nearest Neighbors, X-means clustering, or any other unsupervised anomaly detection algorithm which is capable to compute anomaly scores. The anomaly score is a scalar number.

In step 209, the device 101 applies the first prediction model and the second prediction model to the second feature set of the second network flow aggregate.

In step 210, the device 101 selects an output of the first prediction model as a first anomaly score, S_base, for the second network flow aggregate, and an output of the second prediction model as a second anomaly score, S_eval, for the second network flow aggregate. S_base and S_eval are scalars.

In step 211, the device 101 associates the second network flow aggregate with a connection, wherein the connection is based on source and destination information, protocol and destination port of a data flow of the second network flow aggregate. In other words, the connection comprises one or more second network flow aggregates. An S_base and an S_eval is associated to each second network flow aggregate associated with the connection. Therefore, S_base and S_eval of all the second network flow aggregates associated with the connection are collected in a vector associated with the connection.

In step 212, the device 101 determines an average difference value for the connection. First, a difference value is calculated as a difference between the first anomaly score and the second anomaly score for each second network flow aggregate associated with the connection. Then, the average difference value is calculated as an average of the difference values calculated for the second network flow aggregates associated with the connection. According to an optional embodiment and in step 213, the device 101 normalizes the average difference value. The normalized average difference value, ΔS_avg, can be calculated as ΔS_avg=mean(ΔS)=mean((S_base−S_eval)/std(S_base−S_eval)), wherein std(·) is the standard deviation operation of a given array and mean(·) is the average operation.

In step 214, the device 101 associates the connection with a label based on the average difference value and a first threshold, wherein the label either indicates benign traffic or malicious traffic. If the average difference value associated with the connection is higher than the first threshold, the connection is associated with a 'malicious' label/flag/value. The malicious label means that the connection is contaminated with C&C traffic. If the average difference value associated with the connection is lower than the first threshold, the connection is associated with a 'benign' label/flag/value. The benign label means that the connection is not contaminated with C&C traffic. According to an optional step 215, the device 101 performs an action based on the associated label. If the connection is associated with a 'malicious' label, the device 101 may for example instruct the communication device 104a, 104b to block or discard all network traffic from the affected source, or towards the affected destination, or send an alert towards the SIEM 102 system to trigger mitigation actions.

The baseline dataset collection in step 201, the baseline data processing in steps 202-207, and the training of the first prediction model in step 208 do not have to be performed at the same time that the evaluation dataset collection in step 201, the evaluation data processing in steps 202-207, and the training of the second prediction model in step 208 are performed.

Figure 4A:
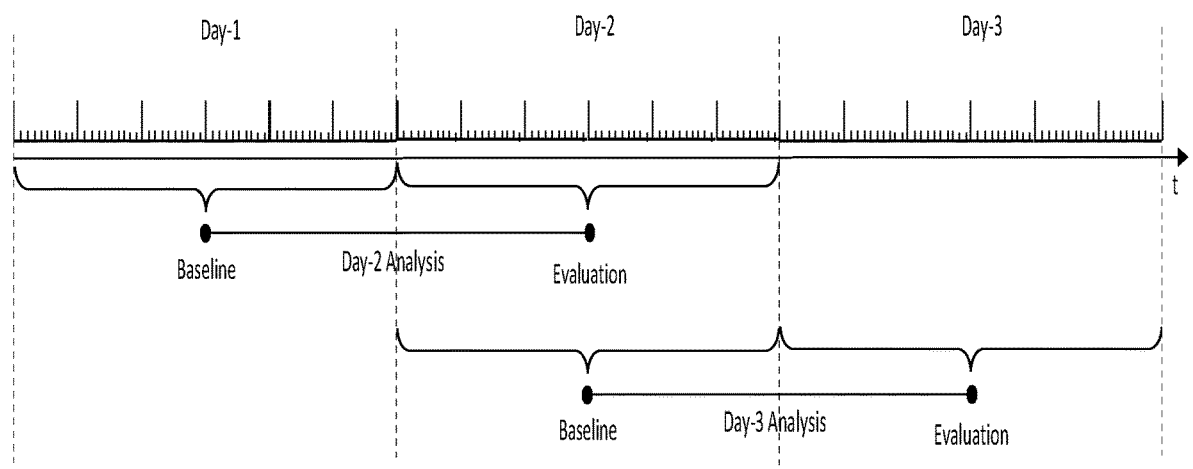
FIG. 4a shows an example of a timeline of dataset collection according to an embodiment.

The method may be operated either in offline, or in online mode. In offline mode, baseline and evaluation datasets are collected separately in step 201 and a one-time analysis is performed using the data processing steps 202-213. In online mode, the data processing steps 202-213 are invoked recurrently for time periods, as shown in FIG. 4a. In the online mode, data flows collected in the most recent time period are handled as evaluation dataset and data flows from the directly preceding period are handled as baseline dataset. In the online mode, the method in FIG. 4a is capable to detect newly appearing C&C communication in the most recent time period.

Figure 3:
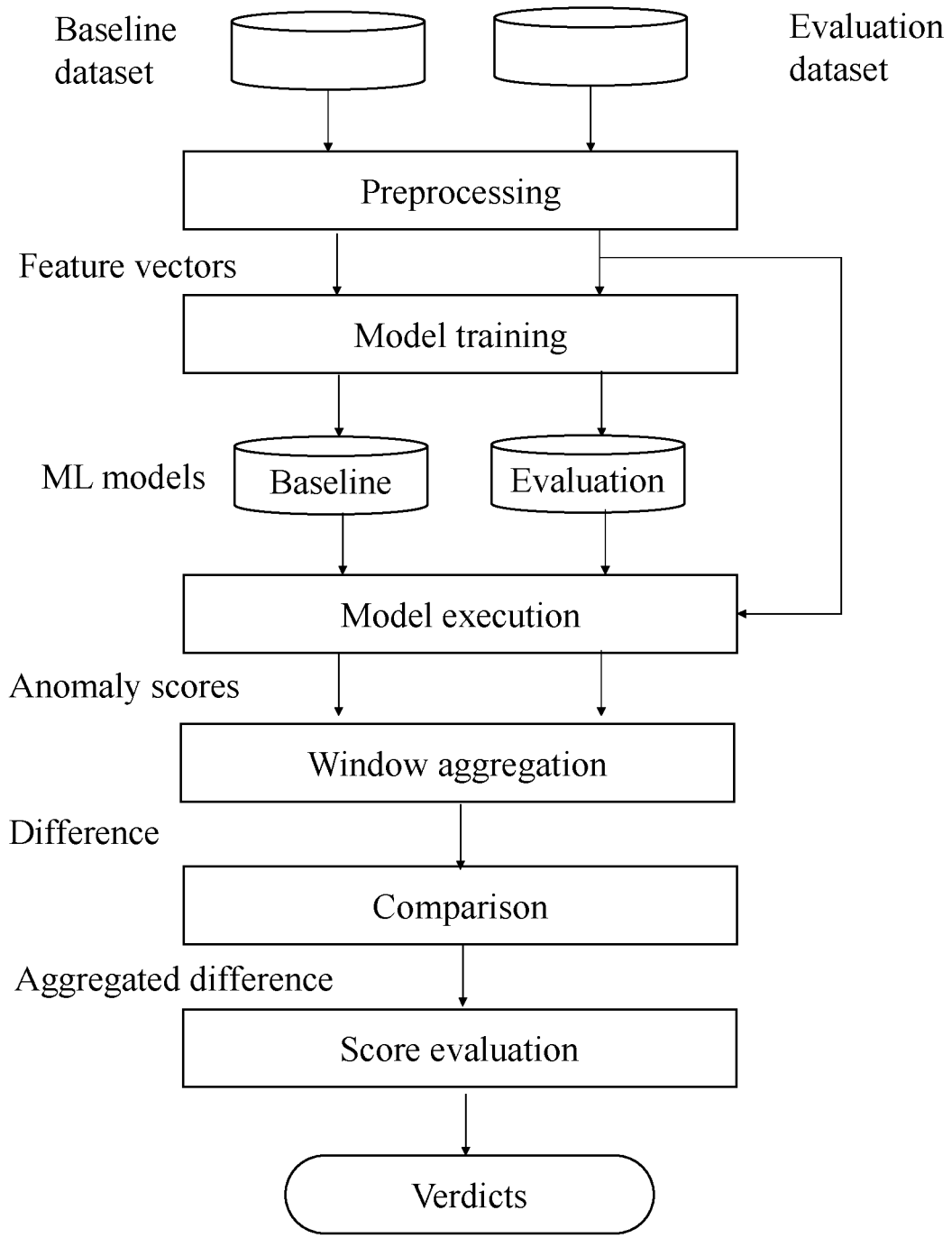
FIG. 3 shows a flow chart illustrating exemplary steps for performing a method according to an embodiment.

FIG. 3 shows a flow chart illustrating exemplary steps for performing the method in FIG. 2. The method according to an embodiment takes two different data flow datasets as an input. The first or baseline dataset is a reference dataset with benign traffic from the monitored device population collected in a first dataset window. The second or evaluation dataset is a dataset from the same device population which is being analyzed for potential contamination collected in a second dataset window. In relation to FIG. 3, a preprocessing block corresponds to steps 202-207, a model training block corresponds to step 208, a model execution block corresponds to step 209, a window aggregation block corresponds to step 211, a comparison block corresponds to step 210, 212 and 213, a score evaluation block corresponds to step 214, and a verdicts block corresponds to step 215.

Figure 4B:
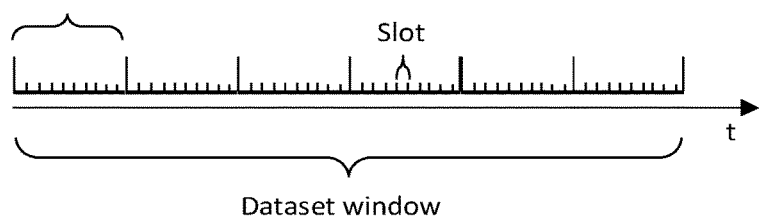
FIG. 4b shows an example of a dataset window, a network aggregation window, and a slot according to an embodiment.

FIG. 4b shows an example of a dataset window, an aggregation window, and a slot. A dataset window is the time first and second data flows are collected. The dataset window is split into non-overlapping network aggregation windows, as displayed in FIG. 4b. A network aggregation window is split into non-overlapping slots. A default network aggregation window size is 1 hour and a default slot size is 1 minute. Default network aggregation window size and slot size fits well usual C&C traffic with period in the few minutes order. For detecting C&C traffic with lower frequency, larger aggregation window size may be used.

The invention disclosed herein provides a better C&C traffic detection accuracy than prior art solutions mentioned in the Background. For quantifying the improvement, the method in FIG. 2 has been compared to a reference anomaly detection algorithm. The reference anomaly detection algorithm profiled the legitimate IoT traffic and applied Isolation Forest outlier detection to isolate C&C traffic. The method in FIG. 2 and the reference anomaly detection algorithm have been applied to the same Internet of Things traffic captured from real-world device fleets and mixed with synthetic C&C traffic, i.e. for every measurement of the real-word IoT traffic, 2% of the device fleet were infected generating Mirai botnet-like C&C traffic, i.e., C&C traffic was generated via traffic synthesis. Two different device fleet datasets have been used. Traffic type, such as machine to machine, M2M, and/or human, number of devices, dataset window, and number of data flows for each device fleet dataset is shown in Table 1. Moreover, network aggregation window size is 1 hour, and slot size is 1 minute. Table 2 shows the evaluated accuracy performance parameters for the two device fleet datasets applying the method in FIG. 2 and the reference anomaly detection algorithm. The evaluated performance parameters are precision, recall, and F1.

TABLE 1

Traffic type, number of devices, dataset window, and number of data flows for each device fleet dataset used for the accuracy performance evaluation.

| Dataset | Traffic type | #Devices | Dataset window [days] | #Data Flows |
|---|---|---|---|---|
| Dataset A | M2M | 25,000 | 5 | 9.2M |
| Dataset B | M2M + Human | 25,000 | 5 | 8.9M |

TABLE 2

Evaluated precision, recall, and F1 obtained applying an embodiment of the method in FIG. 2 and the reference anomaly detection algorithm to four device fleet datasets.

| | Proposed Solution | | | Anomaly detection | | |
|---|---|---|---|---|---|---|
| Dataset | Precision | Recall | F1 | Precision | Recall | F1 |
| Dataset A | 100% | 100% | 100% | 97.7% | 100% | 98.8% |
| Dataset B | 100% | 100% | 100% | 86.4% | 97.4% | 91.5% |

An example scenario in which the invention may be practiced is in relation to a vehicular communication system. A device 101 for botnet traffic detection obtains data flow records from vehicles and/or roadside units collected for a dataset window of, for example, 24 hours and performs a method according to FIG. 2 to detect botnet traffic. Other examples of scenarios in which the invention may be practiced are in relation to an IoT device system for use in one or more application domains, these domains comprising, but not limited to, home, city, wearable technology, industrial application, merged reality, and healthcare. By way of example, an IoT device for a home, an office, a building or an infrastructure may comprise, but not limited to, a baking scale, coffee machine, fridge, microwave oven, door, window, curtain, blind, furniture, light bulb, fan, air-conditioner, cooler, air purifier, humidifier, speaker, television, laptop. personal computer, gaming consoles, remote control, vent, iron, steamer, scanner, photocopier, projector, hologram projector, 3D printer, drill, hand-dryer, alarm clock, clock, security camera, smoke alarm, fire alarm, connected doorbell, electronic door lock, lawnmower, thermostat, plug, irrigation control, flood sensor, moisture sensor, motion detector, weather station, electric meter, water meter, gas meter. By further ways of example, a communication device for use in urban or rural areas may comprise, but not limited to, a connected street lighting, connected traffic light, traffic camera, connected road sign, air control/monitor, noise level detector, transport congestion monitoring, transport controlling device automated toll payment, parking payment, sensor for monitoring parking usage, traffic management, digital kiosk, bin, air quality monitoring sensor, bridge condition monitoring sensor, fire hydrant, manhole sensor, tarmac sensor, water fountain sensor, connected closed circuit television, scooter, hoverboard, ticketing machine, ticket barrier, metro rail, metro station device, passenger information panel, onboard camera, and other connected device on public transport vehicle. As further way of example, a communication device may comprise a wearable device. wherein a wearable device may comprise, but not be limited to, a smart-band, tracker, haptic glove, haptic Virtual Reality-suit, smartwatch, clothes, eyeglasses, head mounted display, earpod, activity monitor, fitness monitor, heart rate monitor, ring, key tracker, blood glucose meter, and pressure meters. As further ways of example, a communication device may comprise an industrial application device wherein an industrial application device may comprise, but not limited to, industrial unmanned aerial vehicle, intelligent industrial robot, vehicles assembly robot, automated guided vehicle. As further ways of example, a communication device may comprise a transportation vehicle, wherein a transportation vehicle may comprise, but not limited to bicycle, motor bike, scooter, moped, auto, rail, train, tram, bus, car, truck, airplane, boat, ship, ski board, snowboard, hoverboard, skateboard, roller-skate, a vehicle for freight transportation, drones, robot, stratospheric aircraft, aircraft, hovercraft. As further ways of example, a communication device may comprise a health or fitness device, wherein a health or fitness device may comprise, but not limited to; a surgical robot, an implantable medical device, or a stationary medical device which may be: an in-vitro diagnostic device, a radiology device, a diagnostic imaging device, or an x-ray device.

Figure 5:
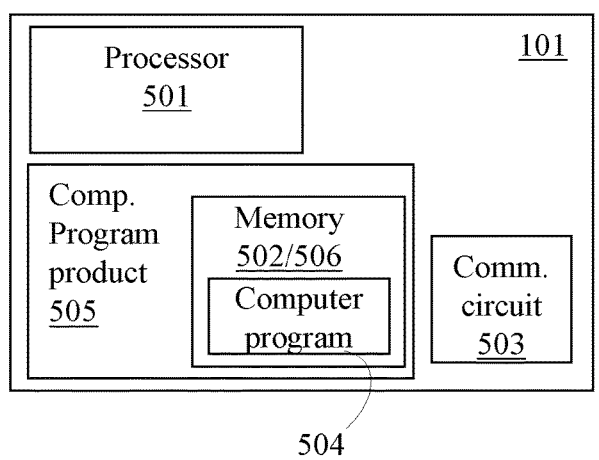
FIG. 5 is a block diagram depicting a device according to an embodiment.

FIG. 5 is a block diagram illustrating an example of a device 101, comprising a processor 501, a computer program product 505 in the form of a computer readable storage medium 506 in the form of a memory 502 and communication circuitry 503. The device 101 is adapted to send a message to a SIEM system 102 and receive a message from a flow exporter 103. The memory 502 contains instructions executable by the processor 501 whereby the device 101 is operative to perform a method as summarized above in relation to the device 101. The communication circuitry 503 of the device 101 is configured to send and/or receive messages in accordance with a predetermined protocol. Said messages are sent between the device 101 and the flow exporter 103 and the SIEM system 102.

The computer program product 505 comprises a computer program 504, which comprises computer program code loadable into the processor 501, wherein the computer program 504 comprises code adapted to cause the device 101 to perform the steps of the method described herein, when the computer program code is executed by the processor 501. In other words, the computer program 504 may be a software hosted by the device 101.

Figure 6:
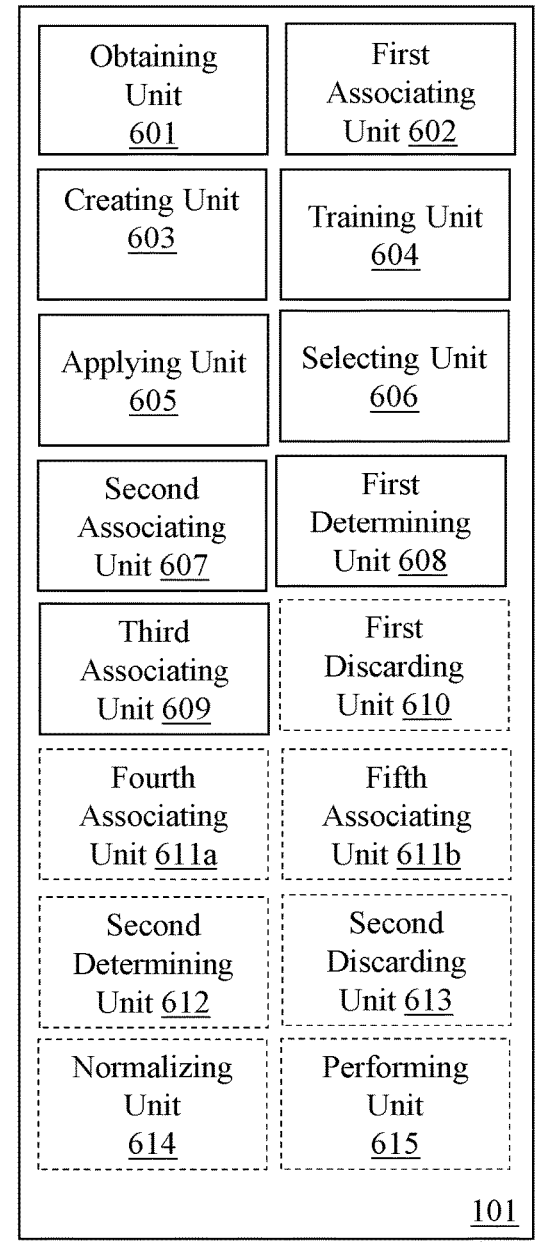
FIG. 6 is a block diagram depicting units of a device according to an embodiment.

FIG. 6 schematically illustrates, in terms of a number of functional units, the components of a device 101 according to an embodiment. The device 101 comprises an obtaining unit 601 configured to obtain 201 information associated with a first data flow of a first communication device 104a and information associated with a second data flow of the first communication device 104a or a second communication device 104b; a first associating unit 602 configured to associate 204 the first data flow with a first network flow aggregate, and the second data flow with a second network flow aggregate; a creating unit 603 configured to create 207 a first feature set for the first network flow aggregate as a first training set, and a second feature set for the second network flow aggregate as a second training set; a training unit 604 configured to train 208 a first prediction model using the first training set, and a second prediction model using the second training set; an applying unit 605 configured to apply 209 the first prediction model and the second prediction model to the second feature set of the second network flow aggregate; a selecting unit 606 configured to select 210 an output of the first prediction model as a first anomaly score for the second network flow aggregate, and an output of the second prediction model as a second anomaly score for the second network flow aggregate; a second associating unit 607 configured to 211 associate the second network flow aggregate with a connection, wherein the connection is based on source and destination information, protocol and destination port of a second data flow of the second network flow aggregate; a first determining unit 610 configured to 212 determine an average difference value for the connection, wherein the average difference value is an average of a difference between the first anomaly score and the second anomaly score; a third associating unit 609 configured to 214 associate the connection with a label based on the average difference value and a first threshold, wherein the label either indicates benign traffic or malicious traffic. Then the device 101 illustrated in FIG. 5 may optionally further comprise: a first discarding unit 610 configured to discard 202 the information associated with the first data flow and/or the information associated with the second data flow if the information matches a criterion of a filter based on a destination and source information; a fourth associating unit 611*a* configured to associate 203*a* the first data flow with a first aggregation, based on the data flow starting time, source and destination information, protocol and destination port of the first data flow; and to associate the second data flow with a second aggregation window and a slot, based on the data flow starting time, source and destination information, protocol and destination port of the second data flow; a fifth associating unit 611*b* configured to associate 203*b* the first data flow of the first aggregation window with a slot of the first aggregation window, based on the data flow starting time, source and destination information, protocol and destination port of the first data flow; and to associate the second data flow of the second aggregation window with a slot of the second aggregation window, based on the data flow starting time, source and destination information, protocol and destination port of the second data flow; a second determining unit 612 configured to determine 205 a first inter-flow set for the first network flow aggregate, wherein the first inter-flow set comprises a first inter-flow time, and to determine a second inter-flow set for the second network flow aggregate, wherein the second inter-flow set comprises a second inter-flow time; a second discarding unit 613 configured to discard 206 the first network flow aggregate if all the first data flows associated with the first network flow aggregate is related to unidirectional traffic and/or if the first data flows associated with the first network flow aggregate are fewer than a second threshold; and/or to discard the second network flow aggregate if all the second data flows associated with the second network flow aggregate is related to unidirectional traffic and/or if the second data flows associated with the second network flow aggregate are fewer than the second threshold; a normalizing unit 614 configured to normalize 213 the average difference value; a performing unit 615 configured to perform 215 an action based on the associated label, wherein the action is an alert sent to a Security Information and Event Management 102 system if the associated label indicates malicious traffic.

In general terms, each functional unit 601-614 may be implemented in hardware or in software. Preferably, one or more or all functional modules 601-614 may be implemented by the processor 501, possibly in cooperation with the communications circuitry 503 and the computer readable storage medium 506 in the form of a memory 502. The processor 501 may thus be arranged to from the computer readable storage medium 506 in the form of a memory 502 fetch instructions as provided by a functional module 601-614 and to execute these instructions, thereby performing any steps of the device 101 as disclosed herein.

The invention claimed is:

1. A device for supporting botnet traffic detection, the device comprising:
   a processor; and
   a memory, the memory containing instructions executable by the processor, wherein the instructions, when executed by the processor, cause the device to:
   obtain information associated with a first data flow of a first communication device and information associated with a second data flow of the first communication device or a second communication device;
   associate the first data flow with a first network flow aggregate, and the second data flow with a second network flow aggregate;
   create a first feature set for the first network flow aggregate as a first training set, and a second feature set for the second network flow aggregate as a second training set;
   train a first prediction model using the first training set, and a second prediction model using the second training set;
   apply the first prediction model and the second prediction model to the second feature set of the second network flow aggregate;
   select an output of the first prediction model as a first anomaly score for the second network flow aggregate, and an output of the second prediction model as a second anomaly score for the second network flow aggregate;
   associate the second network flow aggregate with a connection, wherein the connection is based on source and destination information, protocol and destination port of the second data flow of the second network flow aggregate;
   determine an average difference value for the connection, wherein the average difference value is an average of a difference between the first anomaly score and the second anomaly score;
   associate the connection with a label based on the average difference value and a first threshold, wherein the label either indicates benign traffic or malicious traffic;
   determine whether or not the label indicates malicious traffic; and
   after determining that the label indicates malicious traffic, raise an alarm and/or initiate a remedial action.

2. The device of claim 1, wherein the instructions, when executed by the processor, cause the device to obtain information associated with the first data flow of the first communication device and information associated to the second data flow of the first communication device or the second communication device, wherein the first data flow relates to benign traffic and the second data flow relates to evaluation traffic, and the information associated with the first data flow and the second data flow comprises destination and source information, and traffic statistics, wherein traffic statistics comprise data flow starting time, data flow ending time, data flow duration, and data flow traffic volume from source to destination and from destination to source.

3. The device of claim 2, wherein the instructions, when executed by the processor, cause the device to discard the information associated with the first data flow and/or the information associated with the second data flow if the information matches a criterion of a filter based on a destination and source information.

4. The device of claim 2, wherein the instructions, when executed by the processor, cause the device to associate the first data flow with a first aggregation window, based on the data flow starting time, source and destination information, protocol and destination port of the first data flow; and
to associate the second data flow with a second aggregation window, based on the data flow starting time, source and destination information, protocol and destination port of the second data flow.

5. The device of claim 4, wherein the instructions, when executed by the processor, cause the device to associate the first data flow of the first aggregation window with a slot of the first aggregation window, based on the data flow starting time, source and destination information, protocol and destination port of the first data flow; and
to associate the second data flow of the second aggregation window with a slot of the second aggregation window, based on the data flow starting time, source and destination information, protocol and destination port of the second data flow.

6. The device of claim 1, wherein the instructions, when executed by the processor, cause the device to determine a first inter-flow set for the first network flow aggregate, wherein the first inter-flow set comprises a first inter-flow time; and
to determine a second inter-flow set for the second network flow aggregate, wherein the second inter-flow set comprises a second inter-flow time.

7. The device of claim 6, wherein the instructions, when executed by the processor, cause the device to associate a plurality of first inter-flow times with the first inter-flow set, wherein the first inter-flow times are ordered in an ascending order; and
to associate a plurality of second inter-flow times with the second inter-flow set, wherein the second inter-flow times are ordered in an ascending order.

8. The device of claim 2, wherein the first inter-flow time is a time difference between the data flow starting time of the first data flow and a consecutive data flow starting time of a further first data flow associated with the first network flow aggregate; and
the second inter-flow time is a time difference between the data flow starting time of the second data flow and a consecutive network flow starting time of a further second data flow associated with the second network flow aggregate.

9. The device of claim 1, wherein the instructions, when executed by the processor, cause the device to associate a plurality of first data flows with the first network flow aggregate, and
to associate a plurality of the second data flows with the second network flow aggregate.

10. The device of claim 9, wherein the instructions, when executed by the processor, cause the device to discard the first network flow aggregate if all the first data flows associated with the first network flow aggregate are related to unidirectional traffic and/or if the first data flows associated with the first network flow aggregate are fewer than a second threshold; and/or
to discard the second network flow aggregate if all the data flows associated with the second network flow aggregate are related to unidirectional traffic and/or if the second data flows associated with the second network flow aggregate are fewer than the second threshold.

11. The device of claim 1, wherein the instructions, when executed by the processor, cause the device to create a first feature set for the first network flow aggregate, wherein the first feature set is based on a feature extracted from the first network flow aggregate, wherein the feature is a value based on traffic volume and packet number distributions and/or temporal behavior of the first network flow aggregate; and
to create a second feature set for the second network flow aggregate, wherein the second feature set is based on a feature extracted from the second network flow aggregate, wherein the feature is a value based on traffic volume and packet number distributions and/or temporal behavior of the second network flow aggregate.

12. The device of claim 1, wherein the instructions, when executed by the processor, cause the device to normalize the average difference value.

13. The device of claim 1, wherein
the instructions, when executed by the processor, cause the device to initiate the remedial action, and
the remedial action comprises blocking and/or dropping traffic from a source of the malicious traffic.

14. The device of claim 1, wherein the instructions, when executed by the processor, cause the device to perform an action based on the associated label, wherein the action is an alert sent to a Security Information and Event Management system if the associated label indicates malicious traffic.

15. The device of claim 1, wherein the instructions, when executed by the processor, cause the device to train a first prediction model and a second prediction model, wherein the first prediction model and the second prediction model are machine learning model models based on an unsupervised method.

16. A method for supporting botnet traffic detection performed by a device for supporting botnet traffic detection, the method comprising:
obtaining information associated with a first data flow of a first communication device and information associated with a second data flow of the first communication device or a second communication device;
associating the first data flow with a first network flow aggregate, and the second data flow with a second network flow aggregate;
creating a first feature set for the first network flow aggregate as a first training set, and a second feature set for the second network flow aggregate as a second training set;
training a first prediction model using the first training set, and a second prediction model using the second training set;
applying the first prediction model and the second prediction model to the second feature set of the second network flow aggregate;
selecting an output of the first prediction model as a first anomaly score for the second network flow aggregate, and an output of the second prediction model as a second anomaly score for the second network flow aggregate;
associating the second network flow aggregate with a connection, wherein the connection is based on source and destination information, protocol and destination port of the second data flow of the second network flow aggregate;
determining an average difference value for the connection, wherein the average difference value is an average of a difference between the first anomaly score and the second anomaly score;

associating the connection with a label based on the average difference value and a first threshold, wherein the label either indicates benign traffic or malicious traffic;

determining whether or not the label indicates malicious traffic; and after determining that the label indicates malicious traffic, raising an alarm and/or initiating a remedial action.

17. The method of claim 16, wherein obtaining information associated with the first data flow of a first communication device and with the second data flow of the first communication device or the second communication device comprises obtaining destination and source information, and traffic statistics, wherein traffic statistics comprise data flow starting time, data flow ending time, data flow duration, and data flow traffic volume from source to destination and from destination to source, wherein the first data flow relates to benign traffic and the data network flow relates to evaluation traffic.

18. The method of claim 16, comprising
associating the first data flow with a first aggregation window based on the data flow starting time, source and destination information, protocol and destination port of the first data flow; and
associating the second data flow with a second aggregation, based on the data flow starting time, source and destination information, protocol and destination port of the second data flow.

19. A system comprising:
a device for supporting botnet traffic detection,
a Security Information and Event Management system, and
a flow exporter device, wherein
the flow exporter device is configured to send to the device for supporting botnet traffic detection i) information associated with a first data flow of a first communication device and ii) information associated with a second data flow of the first communication device or a second communication device;
the device for supporting botnet traffic detection is configured to:
receive the information from the flow exporter device;
associate the first data flow with a first network flow aggregate, and the second data flow with a second network flow aggregate;
create a first feature set for the first network flow aggregate as first training set, and a second feature set for the second network flow aggregate as second training set;
train a first prediction model using the first training set, and a second prediction model using the second training set;
apply the first prediction model and the second prediction model to the second feature set of the second network flow aggregate;
select an output of the first prediction model as a first anomaly score for the second network flow aggregate, and an output of the second prediction model as a second anomaly score for the second network flow aggregate;
associate the second network flow aggregate with a connection, wherein the connection is based on source and destination information, protocol and destination port of the second data flow of the second network flow aggregate;
determine an average difference value for the connection, wherein the average difference value is an average of a difference between the first anomaly score and the second anomaly score;
associate the connection with a label based on the average difference value and a first threshold, wherein the label either indicates benign traffic or malicious traffic; and
send an alert to the Security Information and Event Management system if the associated label indicates malicious traffic; and
the Security Information and Event Management system is configured to perform a mitigation action after receiving the alert.

20. A non-transitory computer readable storage medium storing a computer program comprising instructions, which, when executed by a processing unit on a device causes the device to:
obtain information associated with a first data flow of a first communication device and information associated with a second data flow of the first communication device or a second communication device;
associate the first data flow with a first network flow aggregate, and the second data flow with a second network flow aggregate;
create a first feature set for the first network flow aggregate as first training set, and a second feature set for the second network flow aggregate as second training set;
train a first prediction model using the first training set, and a second prediction model using the second training set;
apply the first prediction model and the second prediction model to the second feature set of the second network flow aggregate;
select an output of the first prediction model as a first anomaly score for the second network flow aggregate, and an output of the second prediction model as a second anomaly score for the second network flow aggregate;
associate the second network flow aggregate with a connection, wherein the connection is based on source and destination information, protocol and destination port of the second data flow of the second network flow aggregate;
determine an average difference value for the connection, wherein the average difference value is an average of a difference between the first anomaly score and the second anomaly score;
associate the connection with a label based on the average difference value and a first threshold, wherein the label either indicates benign traffic or malicious traffic;
determine whether or not the label indicates malicious traffic; and
after determining that the label indicates malicious traffic, raise an alarm and/or initiate a remedial action.

* * * * *